United States Patent [19]

Parrott et al.

[11] Patent Number: 4,636,487

[45] Date of Patent: Jan. 13, 1987

[54] PROCESS FOR THE PREPARATION OF PROMOTED CATALYSTS

[75] Inventors: Stephen L. Parrott; Simon G. Kukes; Howard F. Efner, all of Bartlesville, Okla.

[73] Assignee: Phillips Petroleum Company, Bartlesville, Okla.

[21] Appl. No.: 776,305

[22] Filed: Sep. 16, 1985

[51] Int. Cl.$^4$ .................. B01J 31/00; B01J 21/02; B01J 27/188; B01J 27/19

[52] U.S. Cl. .................... 502/168; 502/204; 502/206; 502/207; 502/210; 502/211; 502/213; 502/219; 502/220; 502/221; 502/222

[58] Field of Search .............. 502/168, 204, 206, 207, 502/210, 211, 213, 219, 220, 221, 222

[56] References Cited

U.S. PATENT DOCUMENTS

| | | | |
|---|---|---|---|
| 2,843,577 | 7/1958 | Friedlander et al. | 502/168 X |
| 2,845,451 | 7/1958 | Lautenschlager et al. | 502/168 X |
| 2,880,255 | 3/1959 | Davis et al. | 502/168 X |
| 3,144,489 | 8/1964 | Hahn | 502/168 X |
| 3,215,640 | 11/1965 | Pitkethly et al. | 502/222 |
| 3,227,646 | 1/1966 | Jacobson et al. | 208/254 |
| 3,287,258 | 11/1966 | Mason | 208/143 |
| 3,366,684 | 1/1968 | Budd | 502/222 X |
| 3,432,442 | 3/1969 | Gleim | 252/435 |
| 3,434,965 | 3/1969 | Joffe | 208/254 |
| 3,477,963 | 11/1969 | Venrooy | 502/220 |
| 3,586,620 | 6/1971 | Conner et al. | 208/111 |
| 3,739,026 | 6/1973 | Wilson, Jr. | 502/168 X |
| 3,840,474 | 10/1974 | Bercik et al. | 502/222 X |
| 3,972,829 | 8/1976 | Michalko | 502/168 X |
| 4,111,796 | 9/1978 | Yanik et al. | 502/221 X |
| 4,118,342 | 10/1978 | Debus et al. | 502/222 |
| 4,243,553 | 1/1981 | Naumann et al. | 252/439 |

FOREIGN PATENT DOCUMENTS

1051003 12/1966 United Kingdom ................ 502/168

OTHER PUBLICATIONS

Experience Reveals Best Presulfiding Techniques for HDS and HDN Catalysts; Hallie, pp. 69–72, 74, Technology, Dec. 20, 1982, Oil and Gas Journal.
Thermal Decomposition of $(NH_4)MoO_2S_2$, $(NH_4)_2MoS_4$, $(NH_4)_2WO_2S_2$ and $(NH_4)_2WS_4$; Prasad et al, pp. 1895–1904, J. Inorganic, Chemistry, 1973, vol. 35, Pergamon Press, Great Britian.

Primary Examiner—Andrew H. Metz
Assistant Examiner—William G. Wright
Attorney, Agent, or Firm—J. Michael Simpson

[57] ABSTRACT

A highly active promoted catalyst, for use in hydrotreating oils, comprising a support, selected from the group consisting of alumina, silica and silica-alumina, and a promoter comprising a hydroxymercaptide of one or more metals, wherein said metals are selected from Group IB, Group VIB, Group VIIB or Group VIII of the Periodic Table, is economically produced without the use of a high temperature calcination or high temperature presulfiding step. In accordance with the invention, the hydroxymercaptide promoter used in said promoted catalyst may be the reaction product of a mercaptoalcohol and one or more metal compounds, wherein said metal compounds comprise metals selected from Group IB, Group VIB, Group VIIB or Group VIII of the Periodic Table.

54 Claims, No Drawings

PROCESS FOR THE PREPARATION OF PROMOTED CATALYSTS

This invention relates to a process for preparing promoted catalysts for hydrotreating oils. In one aspect, this invention relates to an improved process for preparing promoted catalysts wherein said catalysts are sulfided at low temperatures through the use of mercaptoalcohols, thereby removing the need for high temperature calcination and high temperature pre-sulfiding as was previously required in the preparation of sulfided promoted catalysts.

The practice of hydrotreating oils is used for many purposes, a few of which include reducing the amount of metals and nitrogen or sulfur bearing components within an oil stream, selective hydrocracking for the production of improved viscosity oils, and hydrocracking heavy oils to produce gasoline-range hydrocarbon components.

It is well known that certain catalysts have proven to be very efficient in hydrotreating oils. Such catalysts typically comprise a support, such as alumina or silica, which is promoted by metal compounds, either alone or in combination, that are selected from Group IB, Group VIB, Group VIIB or Group VIII of the Periodic Table. The promoting metal compounds, after being calcined at high temperatures, are normally present in the catalyst composition in the form of metal oxides. These oxides are then converted into sulfides, in a pre-sulfiding process, for the purpose of obtaining increased catalyst activity and extended catalyst life.

There are many known methods of presulfiding, each of which requires the use of a sulfiding agent such as $H_2S$, $CS_2$, mercaptans or other organic disulfides. In general, these presulfiding methods involve contacting the sulfiding agent with the oxide catalyst composition in the presence of a carrier gas, such as hydrogen or nitrogen, wherein such contact occurs at a temperature sufficiently elevated to readily convert the oxides to sulfides.

The process of preparing a promoted catalyst for hydrotreating oils, therefore, has previously required the use of both high temperature calcination and high temperature pre-sulfiding to obtain a highly active hydrotreating catalyst. Both of these steps, however, have economic disadvantages due to the expense associated with the required high temperatures and off-production time needed to accomplish them.

It is thus an object of this invention to provide a process for preparing a highly active promoted catalyst for hydrotreating oils, wherein neither a high temperature calcination step nor a high temperature presulfiding step is required.

In accordance with the present invention, a promoted catalyst composition is prepared which comprises a support comprising a refractory material selected from the group consisting of alumina, silica or silica-alumina and a promoter comprising a hydroxymercaptide of one or more metals, wherein said metals are selected from Group IB, Group VIB, Group VIIB or Group VIII of the Periodic Table.

In one embodiment of this invention, a solid catalyst support comprising a refractory material selected from the group consisting of alumina, silica or silica-alumina is impregnated with a promoter comprising one or more metal compounds, wherein said metal compounds comprise metals selected from Group IB, Group VIB, Group VIIB or Group VIII of the Periodic Table, and dried. The thus dried, impregnated catalyst support is then contacted with a mercaptoalcohol to produce the promoted catalyst. After contact with the mercaptoalcohol, the metal compounds present in said impregnated catalyst support will be in the form of hydroxymercaptides. Converting the metal compounds to hydroxymercaptides in this manner removes the need for high temperature calcination and high temperature pre-sulfiding when preparing promoted catalysts for hydrotreating oils.

In an alternate embodiment of this invention, said solid catalyst support is contacted with a mercaptoalcohol prior to being impregnated with a promoter comprising said metal compounds.

In yet another embodiment of this invention, said catalyst support is impregnated with an existing hydroxymercaptide of one or more metals, wherein said metals are selected from Group IB, Group VIB, Group VIIB or Group VIII of the Periodic Table, to produce the promoted catalyst. In one form of this embodiment, one or more metal compounds comprising metals selected from Group IB, Group VIB, Group VIIB or Group VIII of the Periodic Table are contacted with a mercaptoalcohol to produce the hydroxymercaptide, which is then impregnated into said catalyst support. Preparing the promoted catalyst in this manner also removes the need for high temperature calcination and high temperature presulfiding.

Other objects and advantages of the invention will be apparent from the foregoing brief description of the invention and the appended claims as well as the detailed description of the invention which follows.

The promoted catalyst composition used for hydrotreating oils comprises a support and a promoter. The support comprises a refractory material selected from the group consisting of alumina, silica or silica-alumina. Suitable supports are believed to be $Al_2O_3$, $SiO_2$, $Al_2O_3$-$SiO_2$, $Al_2O_3$-$TiO_2$, $Al_2O_3$-$P_2O_5$, $Al_2O_3$-$BPO_4$, $Al_2O_3$-$AlPO_4$, $Al_2O_3$-$Zr_3(PO_4)_4$, $Al_2O_3$-$SnO_2$ and $Al_2O_3$-$ZnO$. Of these supports, $Al_2O_3$ is particularly preferred.

The promoter comprises a hydroxymercaptide of one or more metals, wherein said metals are selected from Group IB, Group VIB, Group VIIB or Group VIII of the Periodic Table. Particularly suitable promoters are iron, cobalt, nickel, tungsten, molybdenum, chromium, manganese, vanadium, copper and platinum. Of these promoters, cobalt, nickel, molybdenum and tungsten are the most preferred.

The promoter may also comprise a hydroxymercaptide which is the reaction product of a mercaptoalcohol and one or more metal compounds, wherein said metal compounds comprise metals selected from Group IB, Group VIB, Group VIIB or Group VIII of the Periodic Table. Particularly suitable metal compounds are those metal compounds comprising iron, cobalt, nickel, tungsten, molybdenum, chromium, manganese, vanadium, copper and platinum. Of these metals, cobalt, nickel, molybdenum and tungsten are the most preferred. A particularly preferred catalyst composition is a support comprising $Al_2O_3$ promoted by a hydroxymercaptide which is produced by reacting $NiCO_3$ and a molybdic acid or $NiCO_3$ and $MoO_3$ with a suitable mercatoalcohol. The metal content of the catalyst composition will generally be in the range of about 0.1 weight-% to about 30 weight-% and will preferably be in the range of about 10 weight-% to about 20 weight- % based upon the weight of the total catalyst composition.

Any suitable mercaptoalcohol may be utilized as the sulfiding agent for the metal compounds. An example of a suitable mercaptoalcohol is a mercaptoalcohol having the following generic formula:

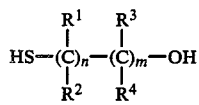

wherein $R^1$, $R^2$, $R^3$ and $R^4$ are independently selected from hydrogen or hydrocarbyl groups (alkyl, cycloalkyl, aryl, alkaryl, cycloalkaryl) having 1-20 (preferably 1-6) carbon atoms, $n=1-10$ (preferably 1-2), and $m=1-10$ (preferably 1-2).

Examples of suitable mercaptoalcohols are 2-mercaptoethanol, 1-mercapto-2-propanol, 1-mercapto-2-butanol, 3-mercapto-1-propanol, 1-mercapto-2-hexanol, 2-mercaptocyclohexanol, 2-mercaptocyclopentanol, 3-mercaptobicyclo[2.2.1]-heptane-2-ol-mercapto-2-pentanol, 1-mercapto-2-phenyl-2-ethanol, 3-mercapto-3-phenyl-propane-1-ol, 2-mercapto-3-phenyl-propane-1-ol, thioglycerol 9-mercapto-10-hydroxyoctadecanoic acid, and 10-mercapto-9-hydroxyoctadecanoic acid. Preferred mercaptoalcohols are $HS-CH_2-CH_2-OH$ (2-mercaptoethanol) and $HS-CH_2-C(C_6H_5)H-OH$ (1-mercapto-2-phenyl-2-ethanol).

The mercaptoalcohol and the metal compounds of the catalyst composition may be contacted in any suitable manner and under any suitable reaction conditions. The metal compounds may be contacted with the mercaptoalcohol either prior to or subsequent to their impregnation into the catalyst support. In addition, the catalyst support may be contacted with the mercaptoalcohol prior to its being impregnated with the metal compounds.

In one embodiment of this invention, the metal compound or compounds are combined with water to form an aqueous solution, which is then combined with the catalyst support. The resulting impregnated catalyst support is then dried prior to being contacted with the mercaptoalcohol. The metal compounds and water may be combined to form an aqueous solution in any suitable manner and under any suitable dissolution conditions.

If the metal compound or compounds are present in an insoluble form, an acid may be combined with the metal compound or compounds in the aqueous solution to insure sufficient solubility. A preferred acid for this purpose is $H_3PO_4$.

The temperature at which the metal compounds are dissolved in water to form an aqueous solution will generally be in the range of about 25° C. to about 150° C. and will more preferably be in the range of about 90° C. to about 110° C. The dissolution pressure will generally be in the range of about 0.1 atmosphere to about 5 atmospheres. The preferred pressure is about 1 atmosphere.

The metal compounds may be dissolved in water for any suitable length of time to form the aqueous solution. The dissolution time will generally be in the range of about 0.1 hour to about 48 hours and will more preferably be in the range of about 0.5 hours to about 4 hours.

The catalyst support may be impregnated with the aqueous solution containing the metal compounds in any suitable manner. Many methods of catalyst support impregnation are known to those skilled in the art. A preferred method of impregnation is to form a slurry by pouring the aqueous solution onto the catalyst support, wherein said slurry is then occasionally agitated, while being subjected to a vacuum, to afford complete absorption of the aqueous solution into the support. It is also within the scope of this invention to apply a vacuum to the catalyst support, for the purpose of maintaining support integrity, prior to combining the support with the aqueous solution.

After impregnating the catalyst support with the aqueous solution of metal compounds, the impregnated catalyst support is then dried. The purpose of this step is to remove water from the pores of the impregnated catalyst support so that said pores will be open for impregnation with a mercaptoalcohol. The impregnated catalyst support may be dried in any suitable manner. Calcination of the catalyst composition, however, is not required. Preferably the catalyst composition will be dried under a heatlamp while being subjected to a vacuum.

The catalyst composition may be dried at any suitable temperature and for any suitable time. The drying temperature will generally be in the range of about 30° C. to about 150° C. and will more preferably be in the range of about 50° C. to about 70° C. The drying time will generally be in the range of about 2 hours to about 48 hours and will more preferably be in the range of about 6 hours to about 24 hours.

The thus dried catalyst composition is then reacted with a mercaptoalcohol and redried, but not calcined, in the manner set forth above. The catalyst composition and the mercaptoalcohol may be combined in any suitable manner and under any suitable reaction conditions. The reaction temperature will generally be in the range of about 50° C. to about 150° C. and will more preferably be in the range of about 70° C. to about 120° C. The reaction pressure will generally be in the range of about 0.5 atmosphere to about 5 atmospheres. A preferred pressure is about 1 atmosphere.

The catalyst composition and the mercaptoalcohol may be reacted for any suitable time. The reaction time will generally be in the range of about 0.1 hour to about 10 hours and will more preferably be in the range of about 0.5 hour to about 2 hours.

In the preferred embodiment, the thus sulfided catalyst is then heated in the presence of hydrogen for the purpose of removing excess mercaptoalcohol prior to its use in hydrotreating oils. The hydrogen pretreatment of the sulfided catalyst may be carried out in any suitable manner. The pretreatment temperature will generally be in the range of about 90° C. to about 300° C. and will more preferably be in the range of about 150° C. to about 250° C. The pretreatment pressure will generally be in the range of about 1 atmosphere to about 30 atmospheres and will more preferably be in the range of about 3 atmospheres to about 7 atmospheres. The sulfided catalyst may be pretreated for any suitable time. The pretreatment time will generally be in the range of about 0.1 hour to about 12 hours and will more preferably be in the range of about 0.5 hour to about 5 hours.

In a second embodiment of this invention, the catalyst support is impregnated with the mercaptoalcohol before it is impregnated with the metal compounds. The catalyst support may be impregnated with the mercaptoalcohol in any suitable manner. A preferred method of impregnation is in accordance with the method previously set forth.

The thus impregnated catalyst support, which has preferably not been dried, is then further impregnated with the metal compounds and subsequently dried in accordance with the methods previously set forth. Following this step, the mercaptoalcohol present in the impregnated catalyst support will react with the metal compounds to produce metal hydroxymercaptides and, thus, the promoted catalyst composition. In the preferred embodiment, the promoted catalyst would then be pretreated in the presence of hydrogen prior to its use in hydrotreating oils.

In another embodiment of this invention, the catalyst support is impregnated, in accordance with the methods previously set forth, with an existing hydroxymercaptide of one or more metals, wherein said metals are selected from Group IB, Group VIB, Group VIIB or Group VIII of the Periodic Table.

In one form of this embodiment, said hydroxymercaptide is the reaction product of one or more metal compounds, comprising metals selected from Group IB, Group VIB, Group VIIB or Group VIII of the Periodic Table, and a mercaptoalcohol. The metal compounds are combined with the mercaptoalcohol and heated for the purpose of assisting the reaction between the two components. Once this reaction is complete, a catalyst support comprising a refractory material selected from the group consisting of alumina, silica or silica-alumina is then impregnated with the resulting hydroxymercaptide and dried, but not calcined, in accordance with the methods previously set forth to produce the promoted catalyst. In the preferred embodiment, the promoted catalyst would then be pretreated in the presence of hydrogen prior to its use in hydrotreating oils.

The metal compounds and the mercaptoalcohol may be combined in any suitable manner and under any suitable reaction conditions. The reaction temperature will generally be in the range of about 20° C. to about 150° C. and will more preferably be in the range of about 80° C. to about 110° C. The reaction pressure will generally be in the range of about 0.1 atmosphere to about 5 atmospheres. A preferred pressure is about 1 atmosphere.

The metal compounds and mercaptoalcohol may be reacted for any suitable time. The reaction time will generally be in the range of about 0.1 hour to about 48 hours and will more preferably be in the range of about 0.5 hour to about 3 hours. The completion of the reaction can be observed by a dark red-brown color of the reaction mixture. Following the completion of the reaction, the reaction product is preferably cooled to room temperature prior to its impregnation into the catalyst support.

The promoted catalyst compositions produced by the various embodiments of this invention may each be used in a hydrofining process for the hydrotreatment of oils. The hydrofining process can be carried out by means of any apparatus whereby there is achieved a contact of the promoted catalyst composition with the hydrocarbon-containing feed stream and hydrogen under suitable hydrofining conditions. The hydrofining process is in no way limited to the use of a particular apparatus. The hydrofining process can be carried out using a fixed catalyst bed, fluidized catalyst bed or a moving catalyst bed. Presently preferred is a fixed catalyst bed.

Any suitable reaction time between the catalyst composition and the hydrocarbon-containing feed stream may be utilized. In general, the reaction time will range from about 0.1 hours to about 10 hours. Preferably, the reaction time will range from about 0.3 to about 5 hours. Thus, the flow rate of the hydrocarbon-containing feed stream should be such that the time required for the passage of the mixture through the reactor (residence time) will preferably be in the range of about 0.3 to about 5 hours. This generally requires a liquid hourly space velocity (LHSV) in the range of about 0.10 to about to 10 cc of oil per cc of catalyst per hour, preferably from about 0.2 to about 3 cc/cc/hr.

The hydrofining process can be carried out at any suitable temperature. The temperature will generally be in the range of about 250° C. to about 550° C. and will preferably be in the range of about 350° C. to about 450° C.

Any suitable hydrogen pressure may be utilized in the hydrofining process. The reaction pressure will generally be in the range of about atmospheric to about 10,000 psig. Preferably, the pressure will be in the range of about 500 to about 3,000 psig.

Any suitable quantity of hydrogen can be added to the hydrofining process. The quantity of hydrogen used to contact the hydrocarbon-containing feed stream will generally be in the range of about 100 to about 20,000 standard cubic feet per barrel of the hydrocarbon-containing feed stream and will more preferably be in the range of about 1,000 to about 6,000 standard cubic feet per barrel of the hydrocarbon-containing feed stream.

The following examples are presented in further illustration of the invention.

EXAMPLE I

This example illustrates the preparation of two sulfur-containing Ni/Mo-promoted alumina catalyst compositions.

Invention Catalyst A:

30 mL of $\beta$-mercaptoethanol (BME; manufactured by Phillips Chemical Company, Bartlesville, OK), 3.46 grams of $NiCO_3$ (Fisher Scientific Company) and 11.98 grams of "molybdic acid" (an ammonium molybdate of the approximate chemical formula $(NH_4)_6Mo_7O_{24}\cdot 4H_2O$, containing about 85 weight-% $MoO_3$, marketed by Mallinckrodt, Inc., St. Louis, MO) were charged to a 100 mL beaker equipped with a magnetic stirrer. The mixture was heated with stirring to about 93° C. for the purpose of facilitating a reaction of BME and the metal compounds, thereby at least partially forming a Ni, Mo-ethanolmercaptide. The heated solution turned dark. It was then cooled to room temperature.

About 30 mL of the thus prepared solution, diluted with some water to reduce its viscosity, was poured over 40 grams of alumina (dried at 350° C./16 hrs.; having a $BET/N_2$ surface area of about 293 $m^2/g$; marketed by Nissha Iwa, Japan). The formed slurry was subjected to a vacuum and was then heated under a heat lamp while still under vacuum and while being occasionally agitated, so as to afford complete absorption of the Ni, Mo- ethanol mercaptide into the alumina. The catalyst composition was then spread out in an evaporating dish and left to dry overnight under a heat lamp.

The dried catalyst material contained about 1.6 weight-% Ni and about 7.9 weight-% Mo (as measured by X-ray fluorescence). After all organic materials were burned off, the catalyst contained about 2.5 weight-% Ni and about 12.1 weight-% Mo.

Control Catalyst B:

16.4 grams of $NiCO_3$, 51.0 grams of $MoO_3$ (Mallinckrodt, lot KMCT) and 9.8 grams of 85% $H_3PO_4$ were added to about 80 mL of water. The mixture was stirred and heated under reflux conditions for about 4 hours. 33.65 grams of the thus prepared green solution (containing about 6.83 grams of Mo, 1.62 grams of Ni and 0.53 grams of P) was diluted with water to give a total volume of 31 mL of a solution, which was then poured onto 40 grams of alumina under vacuum conditions (as explained for catalyst A). The thus impregnated catalyst composition was dried overnight under a heat lamp, and calcined in flowing air (400° F./2 hours; then 500° F./1 hour; 800° F./2 hours). This catalyst composition contained 12.7 weight-% Mo, 3.0 weight-% Ni and, 1.0 weight-% P.

Catalyst B was then presulfided, before its use in hydrofining tests, as follows: A tubular, stainless steel reactor of about ¾" I.D. was filled with a mixture of 12.5 cc (8.43 g) of Catalyst B and 12.5 cc (24.9 g) of Alundum alumina (surface area: less than 1 m²/g, marketed by Norton Chemical Process Products, Akron, Ohio). On top and below this mixture were placed Alundum layers of 9" and 4" height, respectively. The reactor tube was purged with $N_2$, heated to 400° F. in $H_2$, heated at 400° F. for 28 hours in a stream of $H_2$ (0.46 SCF/hr) plus $H_2S$ (0.05 SCF/hr) and at 700° F. for 28 hours in the $H_2/H_2S$ stream. The reactor contents were then allowed to cool in $H_2/H_2S$ and then in $N_2$.

EXAMPLE II

Catalysts A and B were used in test runs for hydrotreating a light cycle oil having a API gravity of 20.2, a cetane index (1980) of 28.6, a sulfur content of 1.4 weight-%, and the following boiling range distribution: 1.7 volume-% boiled up to 400° F., 28.8 volume-% boiled from 400° to 500° F. and 69.5 volume-% boiled above 500° F. The oil was passed through a ¾" I.D., 16" long, stainless steel reactor packed with a mixture of 12.5 cc of either Catalyst A or B and 12.5 cc of inert 20/40 mesh Alundum $Al_2O_3$ at about 1.0 LHSV, together with 4000 SCF/B $H_2$ (standard cubic feet of hydrogen per barrel of oil), at 1300 psig and 650° F. Control Catalyst B was presulfided as described in Example I. Invention Catalyst A was pretreated in the reactor (before the oil feed was introduced) with $H_2$ (50 psig/148 cc/min. at STP) for 5 hours while the temperature was incrementally raised from about 150° F. to about 600° F., and then cooled. The main purpose of this hydrogen pretreatment was to remove adsorbed excess $\beta$-mercaptoethanol.

The $API^{60}$ gravity of the hydrotreated product was measured at intervals of about 4–16 hours. Results were: an average $API^{60}$ gravity of 28.6 (9 samples; range: 27.3–30.0) of the product obtained in runs with invention Catalyst A; and an average $API^{60}$ gravity of 28.6 (4 samples; range: 28.4–28.8) of the product of runs with control Catalyst B.

These results indicate that the two catalysts were comparable in their performance in hydrotreating tests providing approximately the same $API^{60}$ gravity and thus the same cetane index of the product. The advantage of invention Catalyst A (vs. Catalyst B) is that its preparation was less costly because no high-temperature calcination and no presulfiding was required (as was necessary for control Catalyst B).

EXAMPLE III

This example illustrates another embodiment of this invention.
Invention Catalyst C:

102 grams of $MoO_3$, 32.8 grams of $NiCO_3$ and 19.6 grams of 85% $H_3PO_4$ were added to about 160 mL of water. The reactor contents were stirred and heated under reflux conditions for about 4 hours. One gram of the formed solution contained about 0.245 grams of Mo, 0.059 grams of Ni and 0.018 grams of P. 27.5 grams of this solution, diluted with water so as to provide a total volume of 30 mL, were then poured onto 40 grams of $Al_2O_3$ under vacuum conditions (as explained for Catalyst A), air-dried under a heat lamp, and finally vacuum dried under a heat lamp (but not calcined). Onto the thus dried, impregnated alumina was poured about 30 mL of $\beta$-mercaptoethanol. The catalyst was heated under a heat lamp with agitation. A vacuum was intermittently applied during said heating until the pellets appeared dry. The catalyst material was dried overnight under a heat lamp. Catalyst C was not calcined or presulfided, but before its use, a hydrogen pretreatment was carried out substantially in accordance with the pretreatment of Catalyst A (See Example II). The dried Catalyst C contained about 12.7 weight-% Mo, 3 weight-% Ni, 1 weight-% P.

A light cycle oil was hydrotreated in the presence of invention Catalyst C, essentially in accordance with the operating procedure and conditions outlined in Example II. The average $API^{60}$ gravity of the hydrotreated product was 29.0 (5 samples; range: 28.7–30.1). As has been described in Example II, the hydrotreating of light cycle oil under these conditions with control Catalyst B yielded a product having a $API^{60}$ gravity of 28.6. The hydrotreatment of said oil with a presulfided commercial catalyst (KF-840; marketed by Armak Catalyst Division of Akzona, Inc., 13000 Bay Park Road, Pasadena, Tex., containing 13.0 weight-% Mo and 3.1 weight-% NI), referred to hereinafter as control Catalyst D, produced a product having an $API^{60}$ gravity of 29.3 (4 samples; range: 29.1–29.9).

These results confirm those described in Example II: The $API^{60}$ gravity and thus the cetane index of the products produced in invention and control runs were comparable; invention Catalyst C (prepared without a high temperature calcination and presulfiding step) was as effective as two conventionally prepared, calcined and presulfided control catalysts in the hydrotreating of a light cycle oil.

EXAMPLE IV

This example illustrates the use of the catalysts of this invention in heavy oil hydrofining (demetallization and desulfurization) tests. Two catalysts were employed.

Control Catalyst E was prepared by impregnation of 24.0 grams of alumina (see Example I) with an aqueous solution containing 0.22 grams of $(NH_4)_6Mo_7O_{24}\cdot 4H_2O$, drying, and calcining for about 9 hours at a temperature ranging from 400° to 900° F. The finished catalyst contained about 0.5 weight-% Mo.

Invention Catalyst F was prepared by impregnation of 24.0 grams of alumina with an aqueous solution containing 0.22 grams of $(NH_4)_6Mo_7O_{24}\cdot 4H_2O$ and 2 mL of $\beta$-mercaptoethanol, and subsequent drying (no calcination; no presulfiding). The finished catalyst contained about 0.5 weight-% Mo.

A Maya topped crude (440F+) containing about 300 ppm vanadium, 56 ppm nickel and 3.5 weight-% sulfur was hydrotreated in an apparatus substantially identical to one described in U.S. Pat. No. 4,430,207, Example II. The average liquid hourly space velocity (LHSV) of the feed was 1.01 cc/cc catalyst/hr for the control run employing 50 cc of Catalyst E plus 70 cc of 36 grit Alundum alumina. The average LHSV of the feed in the invention run employing 50 cc of Catalyst F plus 70 cc of Alundum was 0.99 cc/cc catalyst/hr. The reactor temperature in both runs was 750° F.; the pressure was 2250 psig; and the hydrogen flow was 2500 SCF/barrel. Results were:

(a) average %-removal of (Ni+V) was 67.8% for the control run and 67.3% for the invention run;
(b) average removal of sulfur was 35.3% for the control run, and 38.3% for the invention run.

These results demonstrate that the catalyst of this invention prepared by impregnation of a support with a molybdenum compound and a mercaptoalcohol, without subsequent high temperature calcination and presulfiding, is at least as effective in heavy oil hydrofining operations as a control catalyst prepared by conventional impregnation with a molybdenum compound and calcination.

While this invention has been described in detail for the purpose of illustration, it is not to be construed as limited thereby but is intended to cover all changes and modifications within the spirit and scope thereof.

That which is claimed is:

1. A process for preparing a promoted catalyst comprising the steps of:
   impregnating a catalyst support comprising a refractory material selected from the group consisting of alumina, silica and silica-alumina with a promoter comprising one or more dissolved metal compounds, wherein said metal compounds comprise metals selected from Group IB, Group VIB, Group VIIB or Group VIII of the Periodic Table;
   drying the impregnated catalyst support;
   treating the dried, impregnated catalyst support with a mercaptoalcohol, thereby forming a metal hydroxymercaptide; and
   drying the treated catalyst support to produce said promoted catalyst.

2. A process in accordance with claim 1 wherein said catalyst support is alumina.

3. A process in accordance with claim 1 wherein one of said metal compounds is a dissolved nickel compound.

4. A process in accordance with claim 3 wherein said dissolved Ni compound is $NiCO_3$.

5. A process in accordance with claim 1 wherein one of said metal compounds is a dissolved molybdenum compound.

6. A process in accordance with claim 5 wherein said dissolved molybdenum compound is an ammonium salt of molybdic acid.

7. A process in accordance with claim 6 wherein said dissolved molybdenum compound is $(NH_4)_6Mo_7O_{24} \cdot 4H_2O$.

8. A process in accordance with claim 1 wherein said mercaptoalcohol has the generic formula $$HS-(C)_n-(C)_m-OH$$
with $R^1, R^2$ on the first carbon and $R^3, R^4$ on the second carbon wherein $R^1$, $R^2$, $R^3$ and $R^4$ are independently selected from hydrogen or hydrocarbyl groups having 1-20 carbon atoms, $n=1-10$ and $m=1-10$.

9. A process in accordance with claim 8 wherein $n=1-2$ and $m=1-2$.

10. A process in accordance with claim 9 wherein said mercaptoalcohol is selected from the group consisting of $HS-CH_2-CH_2-OH$ and $HS-CH_2-C(C_6H_5)H-OH$.

11. A process in accordance with claim 1 wherein said impregnated catalyst support is dried at a drying temperature in the range of about 30° C. to about 150° C. and for a drying time in the range of about 2 hours to about 48 hours.

12. A process in accordance with claim 11 wherein said drying temperature is in the range of about 50° C. to about 70° C. and said drying time is in the range of about 6 hours to about 24 hours.

13. A process in accordance with claim 1 wherein said treated catalyst support is dried at a drying temperature in the range of about 30° C. to about 150° C. and for a drying time in the range of about 2 hours to about 48 hours.

14. A process in accordance with claim 13 wherein said drying temperature is in the range of about 50° C. to about 70° C. and said drying time is in the range of about 6 hours to about 24 hours.

15. A process in accordance with claim 1, further comprising the step of heating said promoted catalyst in the presence of hydrogen.

16. A process in accordance with claim 15 wherein said heating step is accomplished at a temperature in the range of about 150° C. to about 250° C., at a pressure in the range of about 3 atmospheres to about 7 atmospheres and for a heating time in the range of about 0.5 hour to about 5 hours.

17. A process for preparing a promoted catalyst comprising the steps of:
   impregnating a catalyst support comprising a refractory material selected from the group consisting of alumina, silica and silica-alumina with a mercaptoalcohol;
   impregnating the impregnated catalyst support with a promoter comprising one or more dissolved metal compounds, wherein said metals are selected from Group IB, Group VIB, Group VIIB or Group VIII of the Periodic Table, thereby forming a metal hydroxymercaptide; and
   drying the multiply-impregnated catalyst support to produce said promoted catalyst.

18. A process in accordance with claim 17 wherein said catalyst support is alumina.

19. A process in accordance with claim 17 wherein one of said metal compounds is a dissolved nickel compound.

20. A process in accordance with claim 19 wherein said dissolved nickel compound is $NiCO_3$.

21. A process in accordance with claim 17 wherein one of said metal compounds is a dissolved molybdenum compound.

22. A process in accordance with claim 21 wherein said dissolved molybdenum compound is an ammonium salt of molybdic acid.

23. A process in accordance with claim 22 wherein said dissolved molybdenum compound is $(NH_4)_6Mo_7O_{24} \cdot 4H_2O$.

24. A process in accordance with claim 17 wherein said mercaptoalcohol has the generic formula

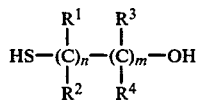

wherein $R^1$, $R^2$, $R^3$ and $R^4$ are independently selected from hydrogen or hydrocarbyl groups (alkyl, cycloalkyl, aryl, alkaryl, cycloalkaryl) having 1–20 carbon atoms, n=1–10 and m=1–10.

25. A process in accordance with claim 24 wherein n=1–2 and m=1–2.

26. A process in accordance with claim 25 wherein said mercaptoalcohol is selected from the group consisting of HS—$CH_2$—$CH_2$—OH and HS—$CH_2$—$C(C_6H_5)$H—OH.

27. A process in accordance with claim 17 wherein said multiply-impregnated catalyst support is dried at a drying temperature in the range of about 30° C. to about 150° C. and for a drying time in the range of about 2 hours to about 48 hours.

28. A process in accordance with claim 27 wherein said drying temperature is in the range of about 50° C. to about 70° C. and said drying time is in the range of about 6 hours to about 24 hours.

29. A process in accordance with claim 17, further comprising the step of heating said promoted catalyst in the presence of hydrogen.

30. A process in accordance with claim 29 wherein said heating step is accomplished at a temperature in the range of about 150° C. to about 250° C., at a pressure in the range of about 3 atmospheres to about 7 atmospheres and for a heating time in the range of about 0.5 hour to about 5 hours.

31. A process for preparing a promoted catalyst comprising the steps of:
impregnating a catalyst support comprising a refractory material selected from the group consisting of alumina, silica and silica-alumina with a hydroxymercaptide of one or more metals, wherein said metals are selected from Group IB, Group VIB, Group VIIB or Group VIII of the Periodic Table; and
drying the impregnated catalyst support to produce said promoted catalyst.

32. A process in accordance with claim 31 wherein said catalyst support is alumina.

33. A process in accordance with claim 31 wherein said metals are selected from the group consisting of cobalt, nickel, molybdenum and tungsten.

34. A process in accordance with claim 31 wherein said hydroxymercaptide is produced by reacting a mercaptoalcohol with one or more metal compounds, wherein said metal compounds comprise metals selected from Group IB, Group VIB, Group VIIB, and Group VIII of the Periodic Table.

35. A process in accordance with claim 34 wherein said catalyst support is alumina.

36. A process in accordance with claim 34 wherein one of said metal compounds is a nickel compound.

37. A process in accordance with claim 36 wherein said nickel compound is $NiCO_3$.

38. A process in accordance with claim 34 wherein one of said metal compounds is a molybdenum compound.

39. A process in accordance with claim 38 wherein said molybdenum compound is an ammonium salt of molybdic acid.

40. A process in accordance with claim 39 wherein said molybdenum compound is $(NH_4)_6Mo_7O_{24} \cdot 4H_2O$.

41. A process in accordance with claim 34 wherein said mercaptoalcohol has the generic formula

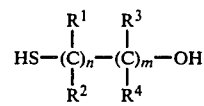

wherein $R^1$, $R^2$, $R^3$ and $R^4$ are independently selected from hydrogen or hydrocarbyl groups (alkyl, cycloalkyl, aryl, alkaryl, cycloalkaryl) having 1–20 carbon atoms, n=1–10 and m=1–10.

42. A process in accordance with claim 41 wherein n=1–2 and m=1–2.

43. A process in accordance with claim 42 wherein said mercaptoalcohol is selected from the group consisting of HS—$CH_2$—$CH_2$—OH and HS—$CH_2$—$C(C_6H_5)$H—OH.

44. A process in accordance with claim 34 wherein said mercaptoalcohol and said metal compounds are reacted at a temperature in the range of about 20° C. to about 150° C., at a pressure in the range of about 0.1 to about 5 atmospheres and for a reaction time in the range of about 0.1 hour to about 48 hours.

45. A process in accordance with claim 44 wherein said mercaptoalcohol and said metal compounds are reacted at a temperature in the range of about 80° C. to about 110° C., at a pressure of about 1 atmosphere and for a reaction time in the range of about 0.5 hour to about 3 hours.

46. A process in accordance with claim 31 wherein said impregnated catalyst support is dried at a drying temperature in the range of about 30° C. to about 150° C. and for a drying time in the range of about 2 hours to about 48 hours.

47. A process in accordance with claim 46 wherein said drying temperature is in the range of about 50° C. to about 70° C. and said drying time is in the range of about 6 hours to about 24 hours.

48. A process in accordance with claim 31, further comprising the step of heating said promoted catalyst in the presence of hydrogen.

49. A process in accordance with claim 48 wherein said heating step is accomplished at a temperature in the range of about 150° C. to about 250° C., at a pressure in the range of about 3 atmospheres to about 7 atmospheres and for a heating time in the range of about 0.5 hour to about 5 hours.

50. A composition comprising a catalyst support comprising a refractory material selected from the group consisting of alumina, silica or silica-alumina and a promoter comprising a hydroxymercaptide of one or more metals wherein said metals are selected from Group IB, Group VIB, Group VIIB, and Group VIII of the Periodic Table.

51. A composition in accordance with claim 50 wherein said catalyst support is alumina.

52. A composition in accordance with claim 50 wherein said metals are selected from the group consisting of cobalt, nickel, molybdenum and tungsten.

53. A composition in accordance with claim 50 wherein the concentration of said metals in said composition is in the range of about 0.1 weight-% to about 30 weight-% based upon the weight of the total composition.

54. A composition in accordance with claim 53 wherein said concentration is in the range of about 10 weight-% to about 20 weight-% based upon the weight of the total composition.

* * * * *